US010913084B2

(12) United States Patent
Tang et al.

(10) Patent No.: US 10,913,084 B2
(45) Date of Patent: Feb. 9, 2021

(54) ELECTRONIC SHOWERHEAD DEVICE

(71) Applicant: OASENSE, Mountain View, CA (US)

(72) Inventors: Chih-Wei Tang, Mountain View, CA (US); Kuan-Teh Li, Fremont, CA (US); Natalie Rowan, San Jose, CA (US); Evan Schneider, Piedmont, CA (US)

(73) Assignee: OASENSE, Mountain View, CA (US)

( * ) Notice: Subject to any disclaimer, the term of this patent is extended or adjusted under 35 U.S.C. 154(b) by 16 days.

(21) Appl. No.: 16/406,143

(22) Filed: May 8, 2019

(65) Prior Publication Data

US 2019/0262849 A1 Aug. 29, 2019

Related U.S. Application Data

(63) Continuation-in-part of application No. 15/231,986, filed on Aug. 9, 2016, now Pat. No. 10,329,751.

(51) Int. Cl.
*B05B 12/12* (2006.01)
*B05B 1/18* (2006.01)
*B05B 12/10* (2006.01)

(52) U.S. Cl.
CPC .............. *B05B 12/122* (2013.01); *B05B 1/18* (2013.01); *B05B 12/10* (2013.01)

(58) Field of Classification Search
CPC ............ B05B 12/22; B05B 12/10; B05B 1/18
USPC .......................................................... 4/615
See application file for complete search history.

(56) References Cited

U.S. PATENT DOCUMENTS

| | | | |
|---|---|---|---|
| 3,895,331 A | 7/1975 | Saarem | |
| 4,191,332 A | 3/1980 | De Langis et al. | |
| 5,829,072 A | 11/1998 | Hirsch et al. | |
| 6,695,281 B2 | 2/2004 | Williams | |
| 8,434,693 B2 | 5/2013 | Brown et al. | |
| 8,876,025 B1 | 11/2014 | Wheeler | |
| 2009/0045268 A1 | 2/2009 | Selander et al. | |
| 2009/0293190 A1 | 12/2009 | Ringelstetter et al. | |
| 2011/0226361 A1 | 9/2011 | Van Der Meijden et al. | |
| 2014/0311592 A1 | 10/2014 | Cutler et al. | |
| 2016/0201305 A1 | 7/2016 | Doss et al. | |
| 2018/0371728 A1 | 12/2018 | Doss et al. | |
| 2019/0045980 A1* | 2/2019 | Yu | A47K 3/28 |

(Continued)

FOREIGN PATENT DOCUMENTS

| | | |
|---|---|---|
| CN | 202778764 U | 3/2013 |
| CN | 105127022 A | 12/2015 |

(Continued)

OTHER PUBLICATIONS

ISR PCT/US2019/062914 dated Feb. 6, 2020.

*Primary Examiner* — Huyen D Le

(74) *Attorney, Agent, or Firm* — AKC Patents, LLC; Aliki K. Collins

(57) ABSTRACT

An electronic showerhead device for automatically controlling water flow includes a showerhead body, a presence detector located within the showerhead body, a first water channel providing a primary water stream exiting the showerhead body, and a second water channel providing a secondary water stream exiting the showerhead body. Turning on a main water valve turns on the second water channel, while the first water channel remains off. Interruption of the presence interrogation beam area by a person or an object turns on the first water channel.

20 Claims, 20 Drawing Sheets

(56) References Cited

U.S. PATENT DOCUMENTS

2019/0366374 A1* 12/2019 Deivasigamani ....... B05B 12/10
2020/0122176 A1* 4/2020 Floyd ...................... G06N 3/08

FOREIGN PATENT DOCUMENTS

WO    WO 2006/086863 A3    8/2006
WO    WO 2010/083746 A1    7/2010

* cited by examiner

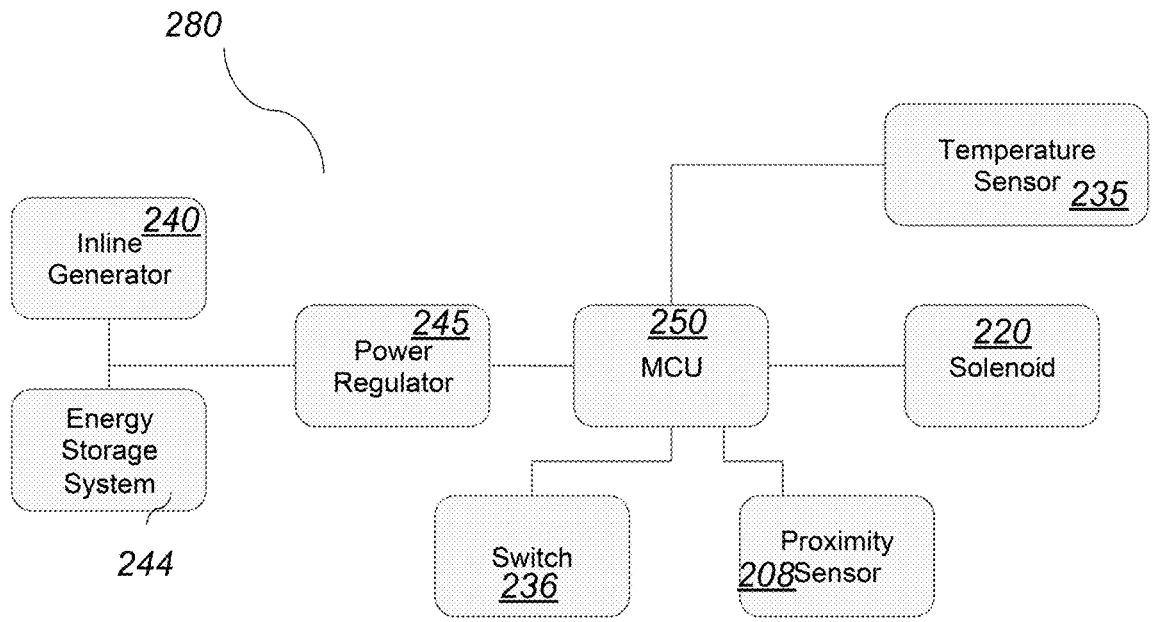

FIG. 29

| | Shower Handle | Solenoid Valve 220 | Water Temperature 235 | Sensor 208 | Generator 240 | Capacitor/battery 244 | User 80 |
|---|---|---|---|---|---|---|---|
| Initial Start | On | Open | Cold | Turned on by generator power | Generating | Re-charging | Outside of the tub |
| Cold water purged | On | Closed | Warm (37C) | Sensing mode | Stopped | Powering the sensor | Ready to step in |
| Shower starts | On | Open | Warm | Detected the user | Generating | Re-charing | Step in the shower |
| Soap /shampoo | On | Closed | Warm | Detecting | Stopped | Powering the sensor | Using Soap |
| Rinse | On | Open | Warm | Detecting | Generating | Re-charing | Rinsing off |
| Done | Off | Open | Warm | Off | Stopped | Slowly losing power | Stepped out |

FIG. 30

ELECTRONIC SHOWERHEAD DEVICE

CROSS REFERENCE TO RELATED CO-PENDING APPLICATIONS

This application is a continuation-in-part and claims the benefit of U.S. application Ser. No. 15/231,986 filed on Aug. 9, 2016 and entitled ELECTRONIC SHOWERHEAD DEVICE, the contents of which are expressly incorporated herein by reference.

FIELD OF THE INVENTION

The present invention relates to an electronic showerhead device and a method for automatically controlling water flow in an electronic showerhead device and in particular to an electronic showerhead device that includes an integrated power source and a sensor for automatically regulating the water flow.

BACKGROUND OF THE INVENTION

Automatic flow control for a showerhead usually involves detection of a user by a presence detector followed by activation of a valve that controls the water flow by the presence detector. The presence detector may be located near a faucet handle of a shower or within the showerhead. Most of the prior art electronic showerheads with automatic flow control require external electrical power and sensor placement by qualified technicians, which makes them difficult to install and expensive for retro-fitting existing showerheads.

Furthermore, the location of the presence detector is critical in order to avoid self-triggering of the showerhead or getting the showerhead valve locked in the ON position. Also, the presence detector is sensitive to the distance and the angle between the showerhead and the user and their performance is affected by the height and perimeter of the user.

Accordingly, there is a need for a water saving showerhead device that reliably and consistently turns the water automatically on when a user enters the sensing area and turns the water automatically off when the user is not in the sensing area for users with different heights and perimeters. There is also a need for an electronic showerhead that does not present the problems of self-triggering or locking the showerhead valve in the ON or OFF positions. There is also a need for an electronic showerhead that allows for a user to retrofit a conventional showerhead and attach the electronic showerhead without the need of special tools, special plumbing or electrical connections or an electrician or a plumber.

SUMMARY OF THE INVENTION

In general, in one aspect, the invention features an electronic showerhead device for automatically controlling water flow including a showerhead body, a presence detector located within the showerhead body, a first water channel providing a primary water stream exiting the showerhead body, and a second water channel providing a secondary water stream exiting the showerhead body. Turning on a main water valve turns on the second water channel, while the first water channel remains off. Interruption of the presence interrogation beam area by a person or an object turns on the first water channel.

Implementations of this aspect of the invention include one or more of the following. The electronic showerhead device further includes an electronically controlled valve and the electronically controlled valve is in-line with the first water channel and is activated by the presence detector. The electronically controlled valve comprises an electromagnetic "latching" solenoid. The showerhead body comprises a spray nozzle located in a first area of the bottom surface of the showerhead body and the presence detector is located in a second area of the bottom surface of the showerhead body and the second area does not intersect with the first area. The presence detector comprises an Infrared (IR) sensor that emits a conically shaped IR presence interrogation beam. The conically shaped IR presence interrogation beam comprises a cone angle in the range of 10 degrees to 45 degrees. The electronic showerhead device further includes a temperature sensor that is configured to measure the temperature of a water stream exiting the showerhead and further to control the electronically controlled valve. The presence detector, the temperature sensor, and a micro-controller unit are assembled onto a printed circuit board (PCB) and the PCB is located in the bottom surface of the showerhead body and is covered by a sensor lens. The electronic showerhead device further includes an inline generator and an energy storage system. The inline generator comprises a turbine system.

In general, in another aspect, the invention features a method for automatically controlling water flow in an electronic showerhead device including the following. Providing a showerhead body comprising a presence detector located within the showerhead body. Providing a first water channel providing a primary water stream exiting the showerhead body. Providing a second water channel providing a secondary water stream exiting the showerhead body. Turning on a main water valve turns on the second water channel, while the first water channel remains off. Interrupting the presence interrogation beam area by a person or an object turns on the first water channel.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

FIG. 29 depicts a block diagram of the electronics system diagram of the showerhead device of FIG. 14; and FIG. 30 depicts a logic diagram of the ON/OFF valve, sensors and user positions of the showerhead device of FIG. 14.

DETAILED DESCRIPTION OF THE INVENTION

The present invention provides an electronic showerhead device that includes an integrated power source and a sensor for automatically regulating the water flow.

Figure 1:
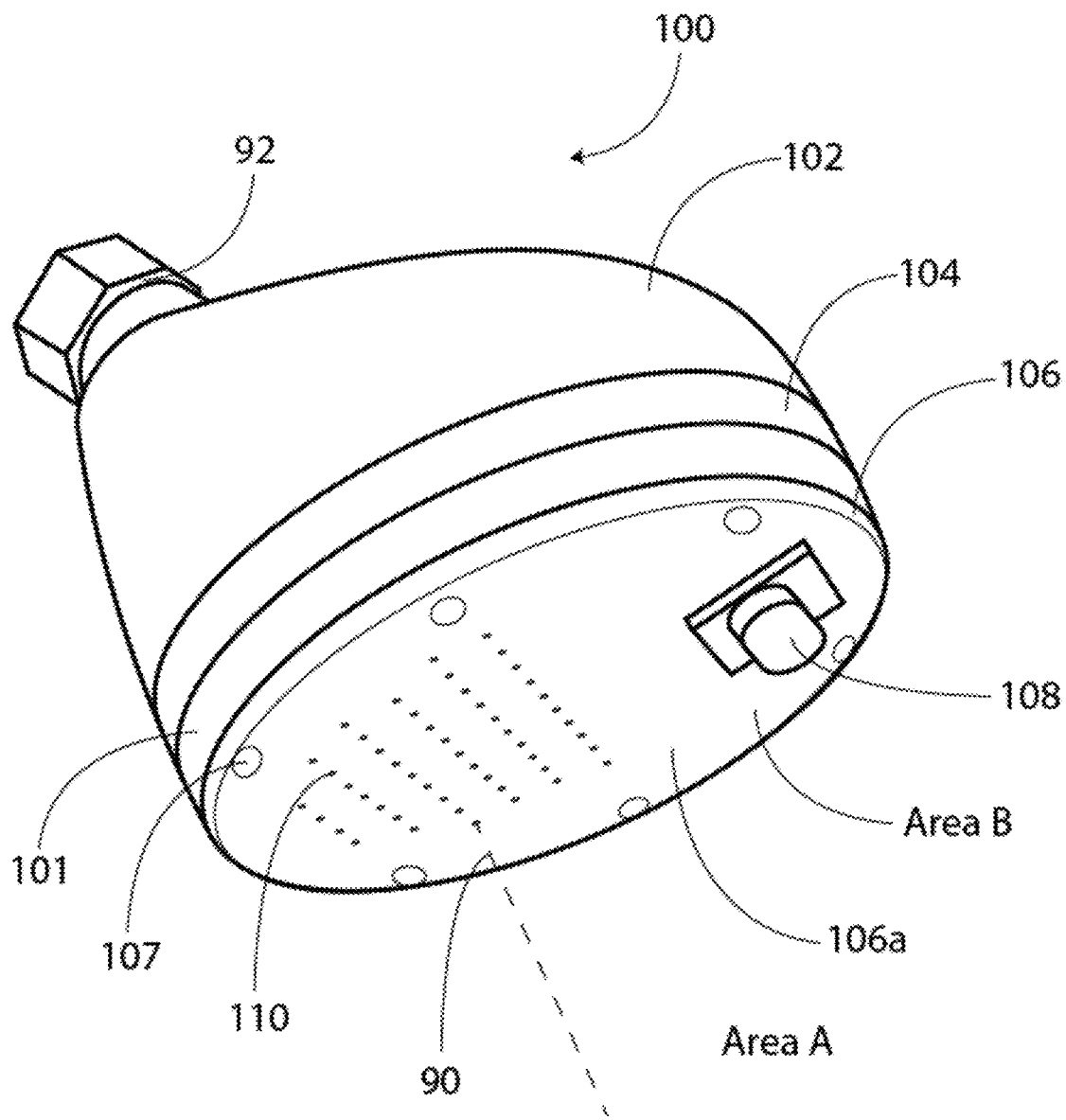
FIG. 1 depicts an electronic showerhead device of this invention.
Figure 2:
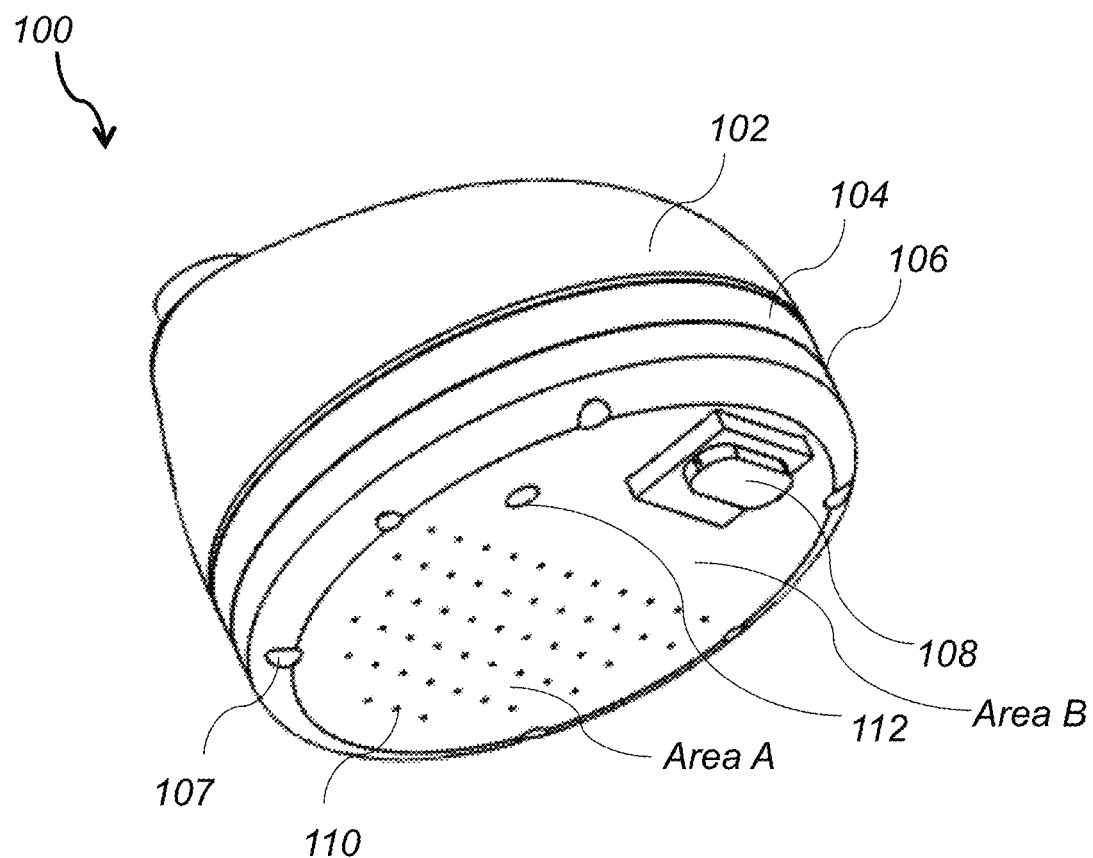
FIG. 2 is a perspective view of the electronic showerhead device of FIG. 1.
Figure 3:
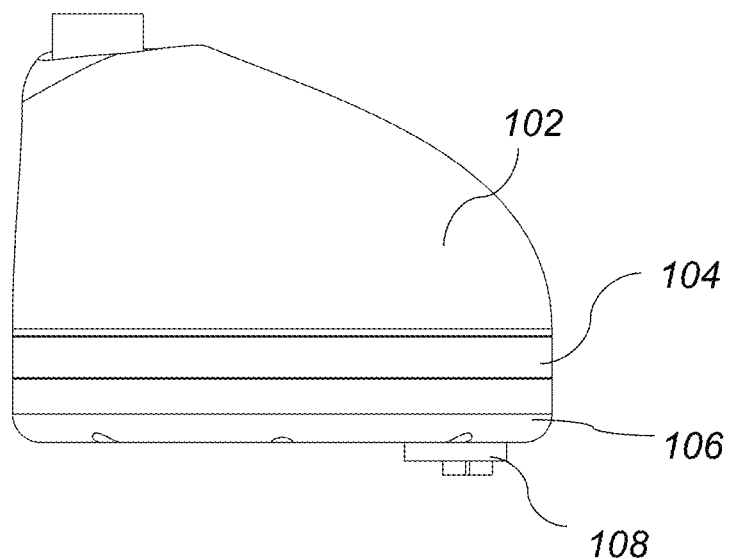
FIG. 3 is a side view of the electronic showerhead device of FIG. 2.
Figure 4:
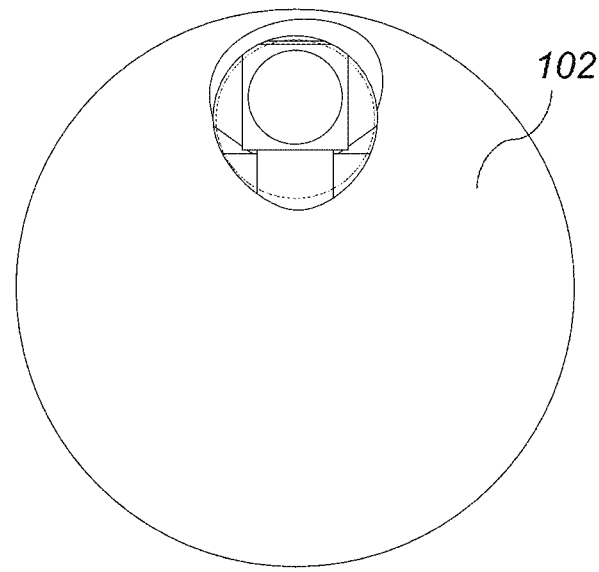
FIG. 4 is a top view of the electronic showerhead device of FIG. 2.
Figure 5:
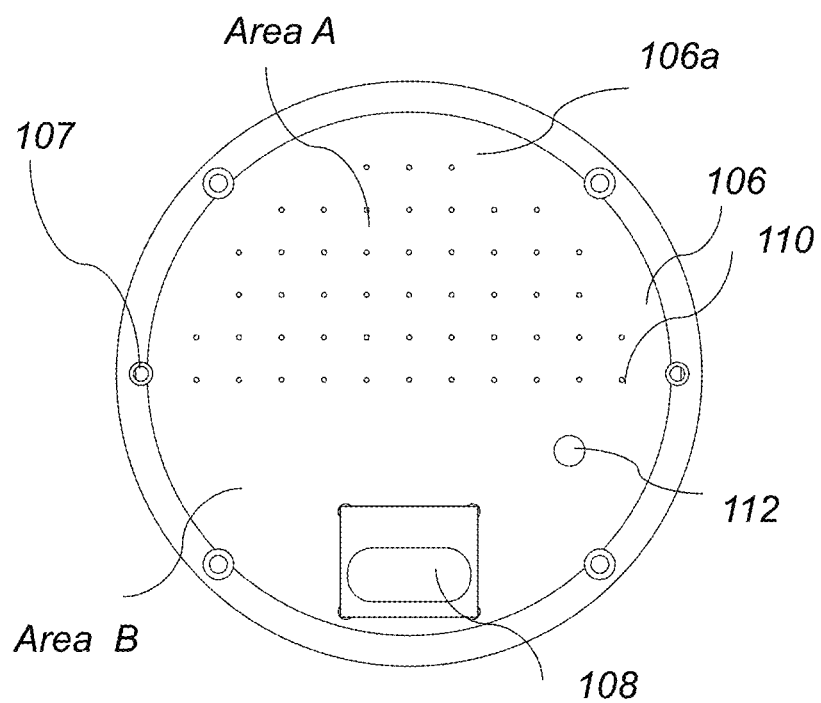
FIG. 5 is a bottom view of the electronic showerhead device of FIG. 2.
Figure 13:
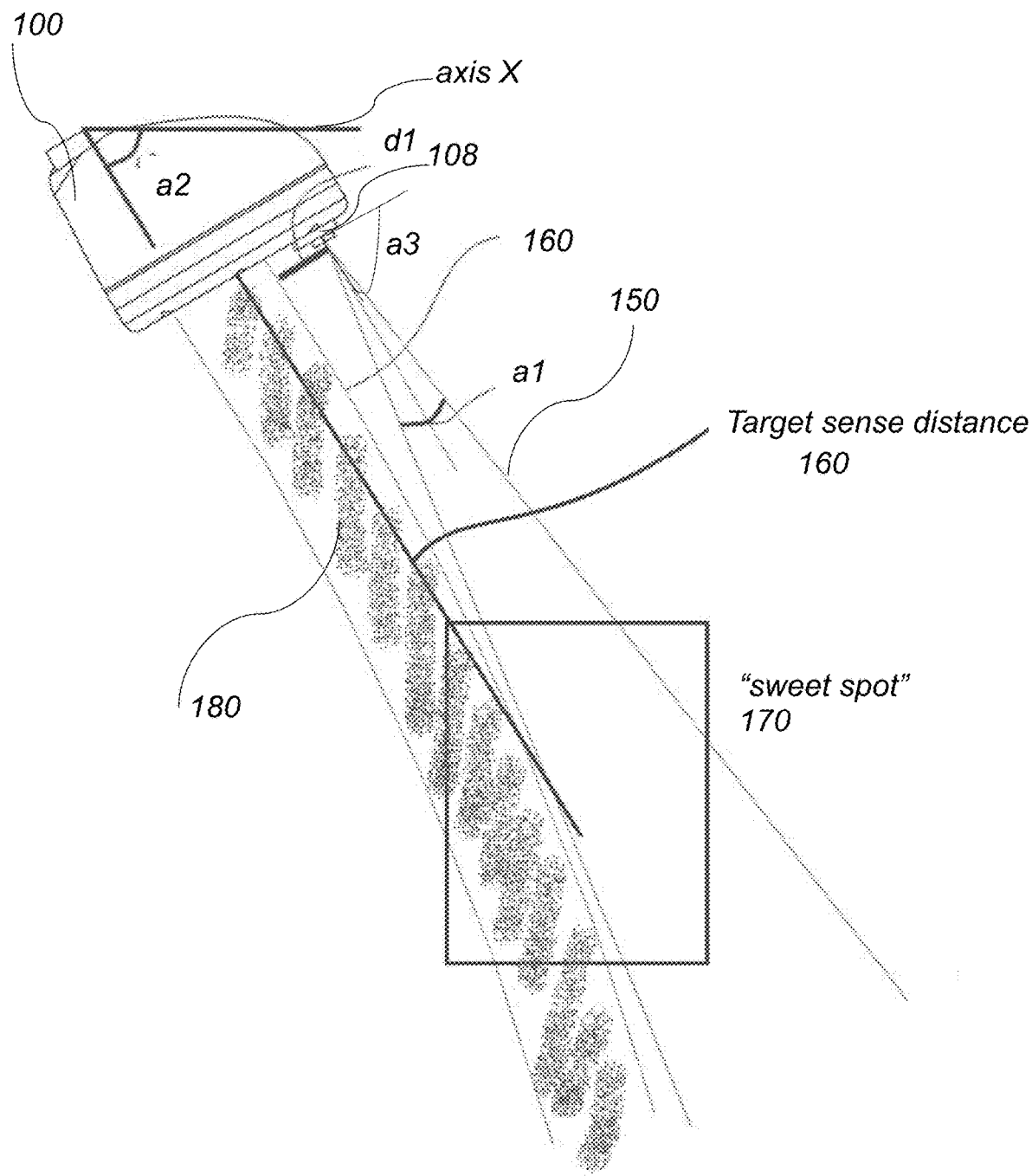
FIG. 13 is a schematic side view of the operating showerhead device of FIG. 1.

Referring to FIG. 1, electronic showerhead device 100 according to this invention includes a hollow dome-shaped top cover 102 and a two-component bottom portion 101. Bottom portion 101 includes a top component 104 and a bottom component 106. The showerhead device is attached to an inlet water pipe 92 at the top. The bottom surface 106a of bottom component 106 includes an area A with openings 110 arranged so that they form a spray nozzle. In operation, water 90 enters the showerhead 100 through the inlet pipe 92 and exits through openings 110 and forms a parabolic water stream 180, as shown in FIG. 13. Bottom surface 106a of the bottom component 106 also includes a sensor 108 protruding from an opening in area B of the bottom surface adjacent to area A. Sensor 108 is an Infrared (IR) sensor that emits a conical shaped IR beam 150 that extends above and adjacent to the water stream 180. In some embodiments, the conical shaped IR beam 150 is tangential to the water stream 180. Sensor 108 looks for reflected beam signals, and turns "ON" when a certain threshold of reflected IR energy is met or exceeded. Sensor 108 controls an ON/OFF valve for the water stream, as will be described below. In other embodiments, sensor 108 is a radar sensor or a capacitor sensor. Bottom surface 106a of the bottom component 106 also includes a power ON/OFF switch 112 that controls the flow of electrical power to the showerhead device 100, as shown in FIG. 2.

Figure 6:
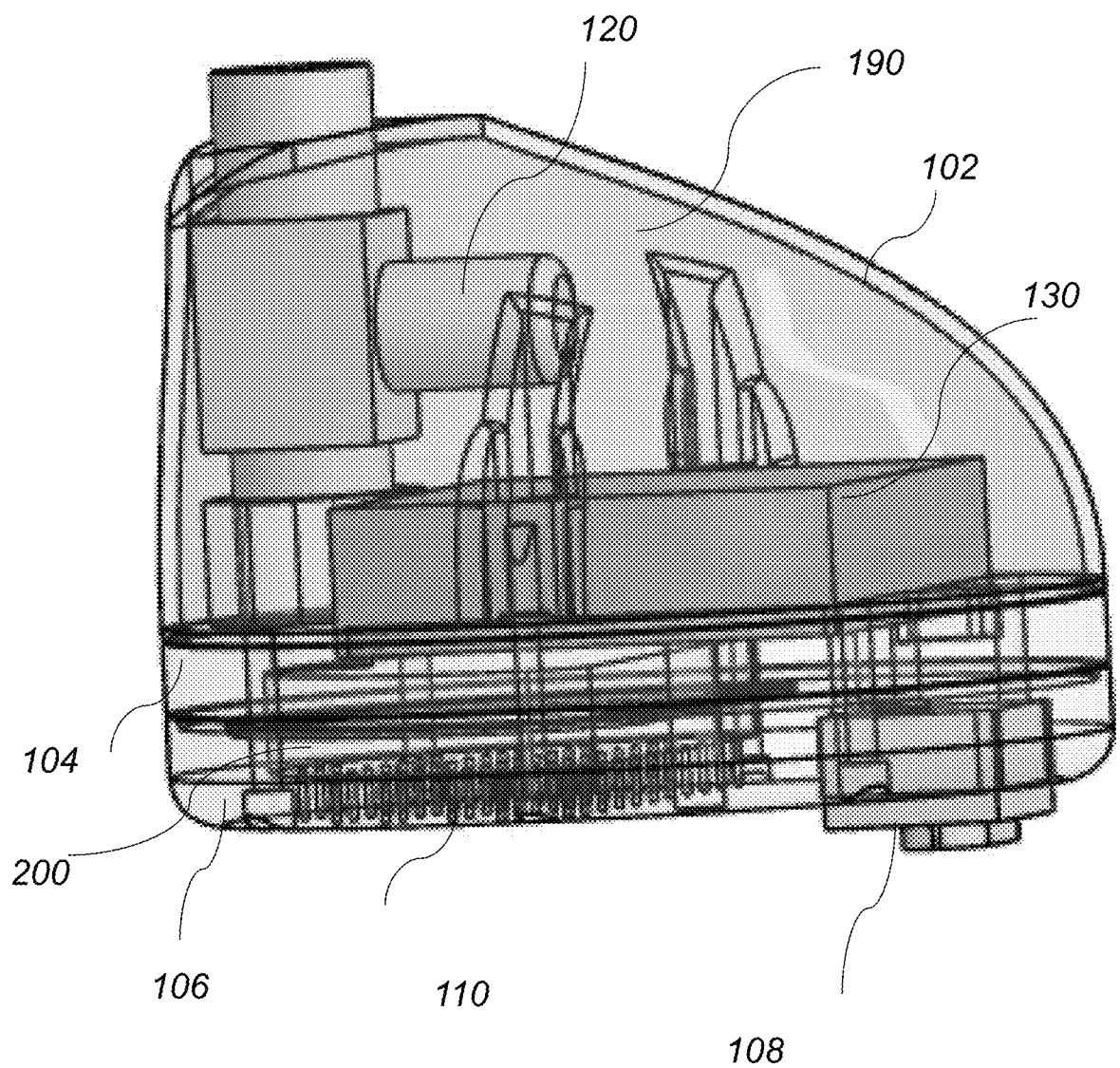
FIG. 6 is a transparent side view of the electronic showerhead device of FIG. 2.
Figure 7:
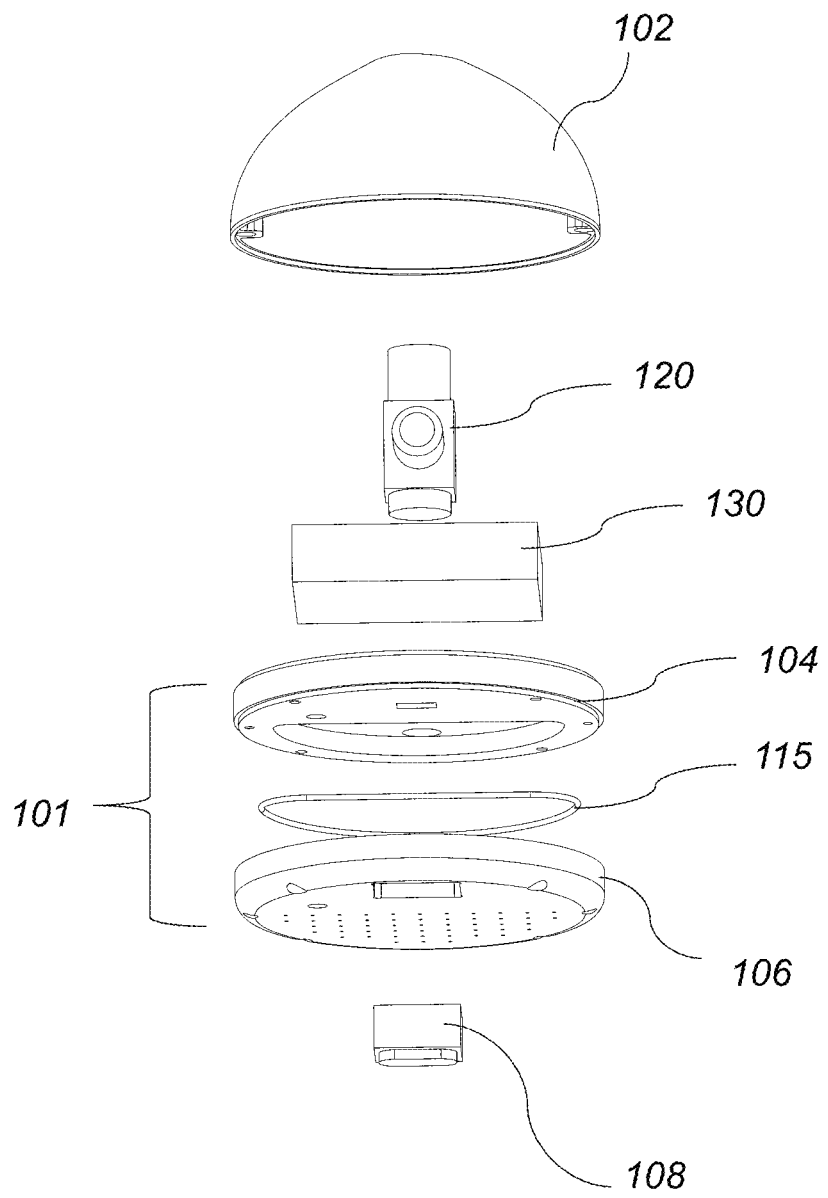
FIG. 7 is an exploded front view of the electronic showerhead device of FIG. 2.
Figure 8:
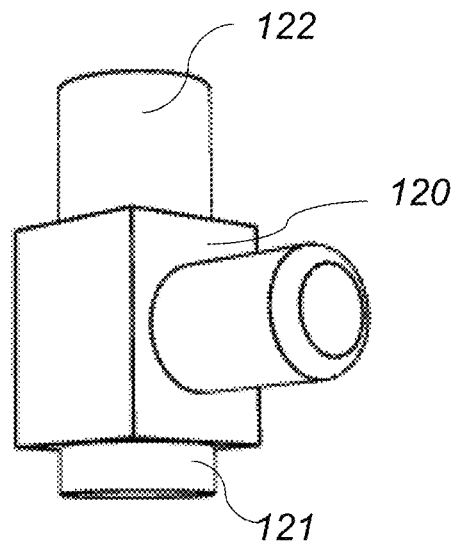
FIG. 8 is a perspective view of the solenoid of FIG. 7.
Figure 9:
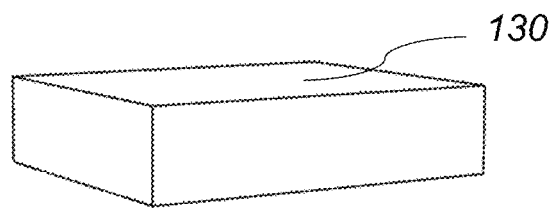
FIG. 9 is a perspective view of the battery pack of FIG. 7.
Figure 10A:
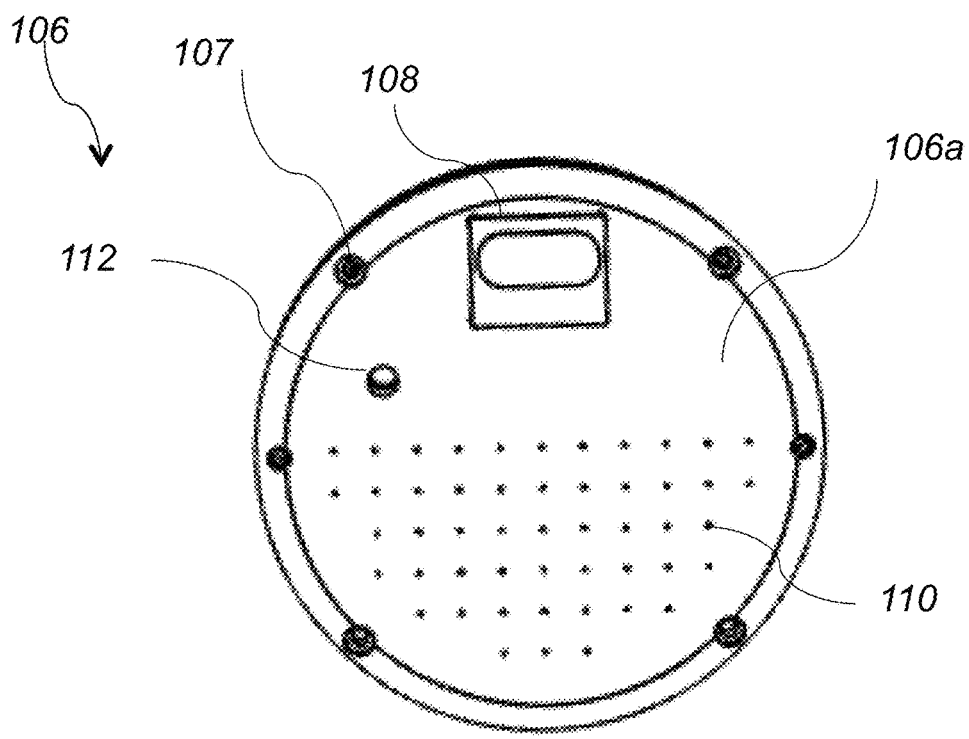
FIG. 10A is a bottom view of the bottom component of FIG. 7.
Figure 10B:
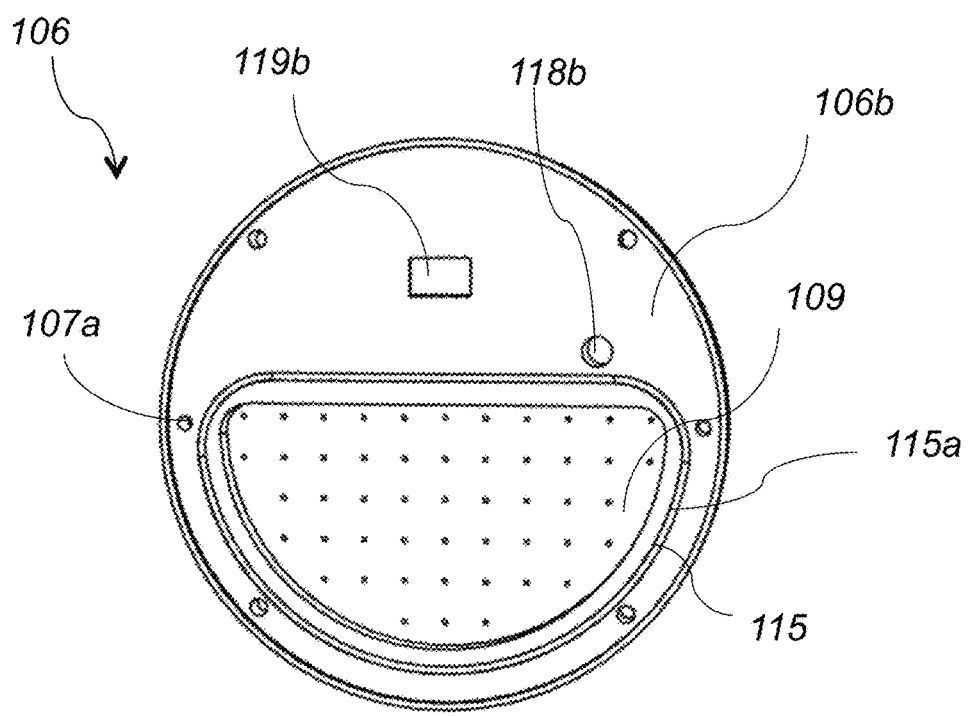
FIG. 10B is a top view of the bottom component of FIG. 7.
Figure 11A:
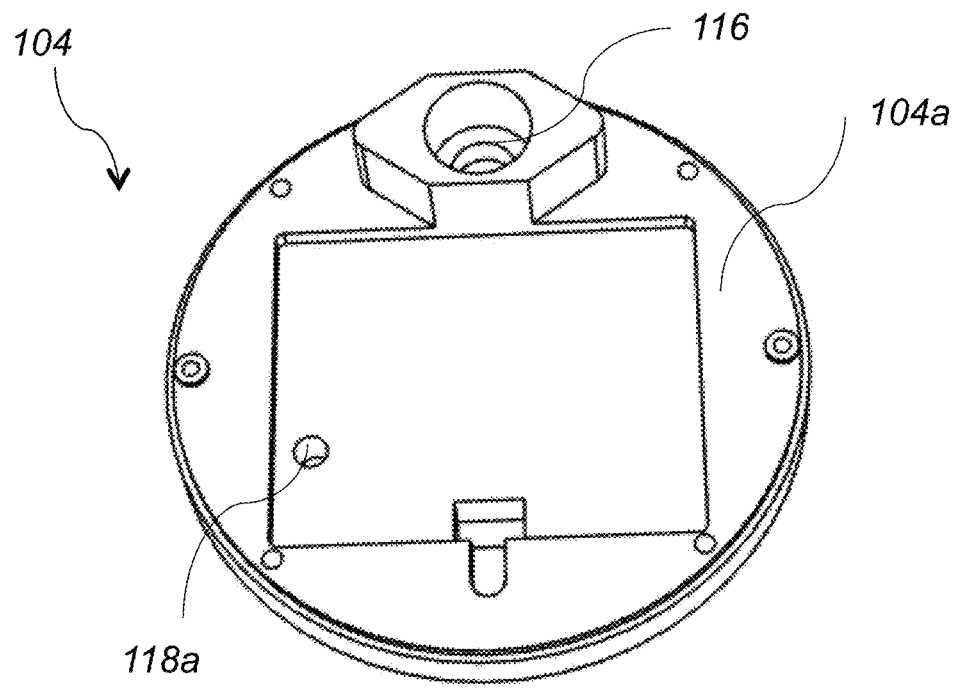
FIG. 11A is a top view of the top component of FIG. 7.
Figure 11B:
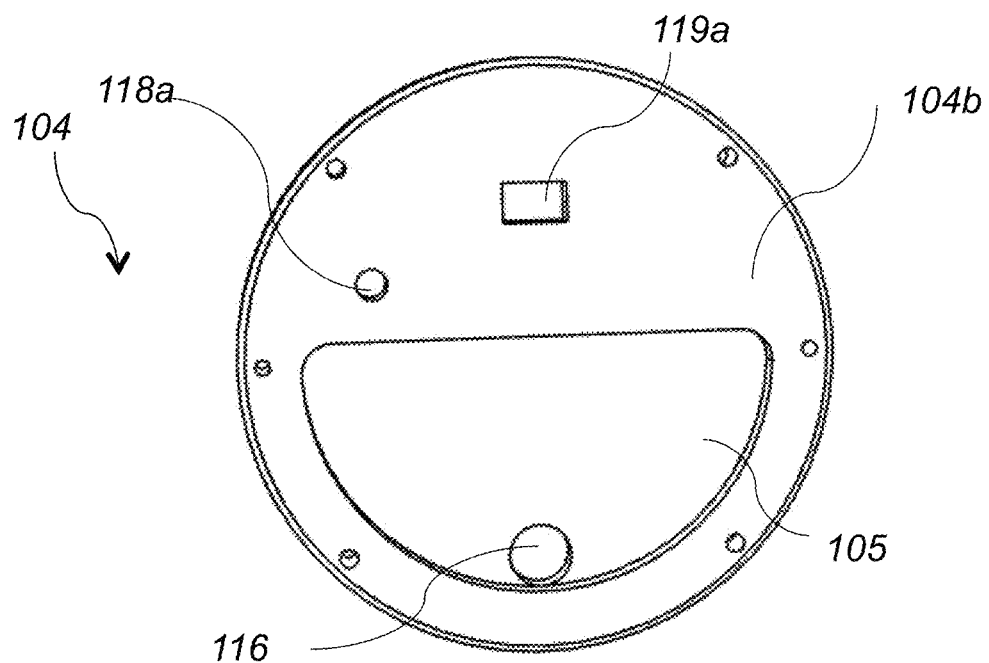
FIG. 11B is a bottom view of the top component of FIG. 7.
Figure 12:
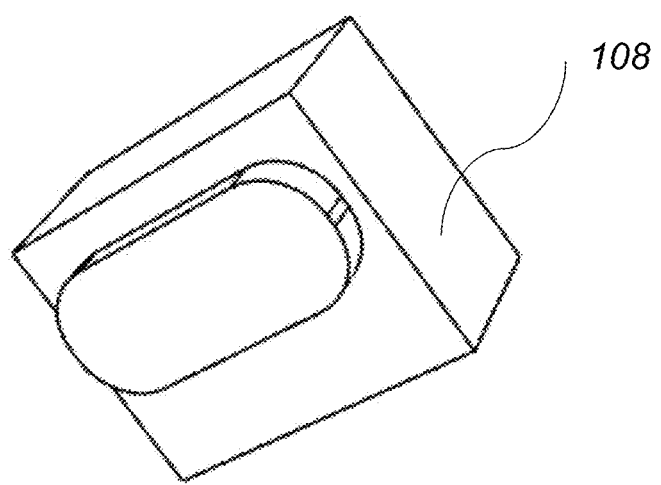
FIG. 12 is a perspective view of the sensor of FIG. 7.

Referring to FIG. 6 and FIG. 7, the electronic showerhead device 100 also includes an electronically controlled valve 120 and a battery pack 130 that are located within the hollow dome-shaped top cover 102 above the two-component bottom portion 101. In one example, the electronically controlled valve is an electromagnetic solenoid 120 that is in-line with the inlet water pipe 92 and is configured to receive an electrical signal from the IR sensor 108 and to turn ON or OFF the flow of water 90 in the water stream 180. Electromagnetic solenoid 120 is a "latching" solenoid that utilizes a permanent magnet to maintain a set position without the constant application of an external electrical current. The latching solenoid 120 requires energy only for transitioning between the ON and OFF states and thus it is suitable for low power applications. Battery pack 130 is waterproof sealed and includes batteries that provide power to the electronic showerhead 100. Battery pack 130 is located above the bottom component 101 within the area 190 that is normally dry. In one example, the battery pack is sealed closed with an O-ring and this prevents exposure of the battery to humidity or accidental splash back.

Referring to FIG. 7, FIG. 10A-FIG. 11B, the two-component bottom portion 101 includes the top component 104 that is stacked above the bottom component 106 and an O-ring 115 arranged between the top and bottom components 104, 106. The two components 104 and 106 are held together with screws 107 that are threaded through recessed through-openings 107a formed in the perimeters of the top and bottom components 104, 106. Screws 107 are not visible from the top or the side of the showerhead and are accessible from the bottom surface 106a of the bottom component 106. The bottom surface 104b of the top component 104 includes a recessed area 105 and the top surface 106b of the bottom component 106 includes a recessed area 109. Recessed areas 105 and 109 are arranged opposite to each other and are sealed closed together with the O-ring 115 that is placed within a groove 115a surrounding the recessed area 109. A closed sealed space 200 is formed between the recessed areas 105 and 109 and water exiting the inlet pipe 92 from the bottom 121 of the solenoid 120 enters the closed sealed space 200 and exits through the openings 110 in the bottom component 106. This arrangement of the top and bottom components 104, 106 keeps the water flow within the small volume of the closed and sealed space 200 between the recessed areas 105 and 109, while the remaining components remain dry on top of the bottom portion 101. The volume in space 200 is constrained in size such that it best meets the following two requirements:
  a) Large enough to serve as a constant-pressure reservoir for all nozzles (in the limit where it becomes smaller and smaller, the downstream nozzles get less flow than upstream ones)
  b) Small enough to keep the device compact and preserve dry space for other components within the showerhead. Keeping it small also helps to decrease the thermal mass of the showerhead, resulting in quicker warm-up times for the shower when it is first started at the beginning of a shower session. Additionally, a smaller space results in the reduction of hydrostatic pressure forces on the system, enabling further weight reduction and ease of manufacture.

The top component 104 includes a through-opening 116 that is configured to receive the exiting pipe 121 from the solenoid 120. Top component 104 also includes through openings 118a and 119a that are shaped and dimensioned to receive the ON/OFF power switch 112 and the sensor 108, respectively. Bottom component 106 also includes through openings 118b and 119b that are concentric and coaxially arranged with openings 118a, 119a and are also shaped and dimensioned to receive the ON/OFF switch 112 and the sensor 108. In one example, the two-component bottom portion 101 is made of metal and the top cover 102 is made of plastic that may be colored.

Referring to FIG. 13, in operation, when a person or an object steps under the showerhead device 100, the IR beam 150 is interrupted and the sensor 108 sends a signal to the solenoid 120 that turns the flow of the water in the water stream 180 on. When the person or the object steps away from the showerhead device 100, the IR beam 150 reverts to an uninterrupted state and the sensor 108 sends another signal to the solenoid 120 that turns the flow of the water in the water stream 180 off. In order to ensure reliable and repeatable operation of the ON/OFF function, the sensor 108 is positioned in area B, that is not within but away and above the openings 110 that form the spray nozzle in area A. In this arrangement the water starts to flow below the sensor 108 and continues to fall away from the sensor 108 and forms the parabolic water stream 180 that curves away from the sensing IR beam 150. This geometric configuration is critical for the reliable operation of the sensor 108, because it prevents auto-triggering and any unintended persistence of the sensor 108 in the ON-position. This design also provides adequate water flow in the water stream 180 for providing satisfactory shower coverage and experience. In the example of FIG. 13, the showerhead 100 is arranged at an angle a2 relative to the horizontal axis X and the sensor 108 is positioned at a distance d1 away and above the openings 110 in area A, and is oriented so that it is parallel to the bottom surface of bottom component 106. In some embodiments distance d1 is adjustable. In other embodiments, sensor 108 is mounted on a pivoting gimbal so that the angle between the sensor 108 and the bottom surface of the bottom component 106 is also adjustable. The IR sensing zone 150 is arranged so that it forms a conical beam having an internal cone angle a1. The ON/OFF power switch 112 for the electrical power is co-located within the IR sensing zone 150 and is set so that when a user powers the showerhead device OFF, the solenoid 120 is first latched into the "open" state. In this "open"/OFF state, the electronic showerhead 100 functions like a typical showerhead that is controlled by manual valves. Sensor 108 may also be programmed to switch the solenoid 120 into the "open" state prior to powering off.

Furthermore, in order for the showerhead 100 to work as an intermittent showerhead that is responsive to people of average size, the shower sensor 108 needs to have a suitable detection range 160. In one example, the target sense distance 160 is in the range of 12" to 24" inches. In order for the shower stream 180 to be pleasant to the user and for the sensor to be inexpensive, the detection area 150 must not be a line but rather a region of space. This is accomplished by selecting a sensor 108 with an adequate cone angle a1. Introducing a wide detection area 150, however, opens up the possibility of sensor self-triggering events in which the water emanating from the showerhead 100 triggers the sensor 108 to remain activated temporarily or indefinitely, whether or not a person is in fact in the detection area 150. In order to avoid such a problem, the detection area beam 150 must not (or only minimally) intersect the flow path of water 180. There are many variables that govern this relationship, which are described in more detail below. The key variables that determine the "sweet spot" area 170 include the sensor placement distance d1, the sensing beam cone angle a1, the angle a2 of the showerhead relative to axis X (i.e., the floor), the angle of the sensor 108 relative to the bottom surface of 106 and the water nozzle size (i.e., diameter of openings 110) and number.

i) Sensor placement relative to water exit, distance d1. The farther the sensor 108 is away from the water exit, the less likely self-detection is. However for aesthetic and usability purposes, this distance d1 should be kept to a minimum. For example, if the sensor 108 is too far away from the water stream 180, the trigger zone won't be in a flow area—the user will turn on the shower but not get wet. In one example, this distance d1 is in the range of 0.5" to 2" inches. In another example, distance d1 is 1.375" inches. In other examples, d1 is adjustable.

ii) Sensor internal cone angle (a1). Decreasing this angle a1 minimizes the probability of self-detection, but also shrinks the trigger zone. In one example this angle a1 is in the range of 10 to 45 degrees. In another example, a1 is 15 degrees.

iii) Angle of the showerhead relative to floor (a2). In one example, this angle is user-adjustable, ranging from about 35 degrees to about 60 degrees. This angle affects the trajectory of the water exiting from the shower, which is additionally influenced by gravity. The shower must work as intended throughout this range.

iv) Angle (a3) of the sensor 108 relative to the bottom surface of the bottom component 106 of the showerhead. In one example, this angle is 90 degrees (the sensing beam emanates the shower at the same slope as the water). Decreasing this angle, so that the beam points away from the water, increases the maximum sensing distance, at the expense of an increased disparity between the sense area and flow area.

v) Water nozzle size and number. The smaller the diameter of the nozzles/openings 110 is (and the fewer nozzles there are), the faster the water will exit the shower and the straighter (less curved) its parabolic trajectory 160 will be. It is possible to tune the nozzle diameter and shape so that the tangency point between the water path 180 and the sensor cone 150 (either coincident to or offset from the sensor cone) is as close as possible to the target range (~12-24" in one example). This tangency allows for the watered area to be as close as possible to the sensor area without a self-trigger event, over the greatest vertical delta (to accommodate users of different heights). This defines the "sweet spot" area 170. Tuning water nozzle size also affects how much the nozzles "mist," which can in turn affect the likelihood of self-trigger events. Lastly, tuning water nozzle size and number also affects the feel of the shower (in pressure and volume of water) and therefore should maintain comfortable shower conditions throughout realistic shower flow rates. In one example, the nozzle diameter is 0.040" inch and there are a total of 50 nozzles.

Among the advantages of this invention may be one or more of the following. The electronic showerhead device of this invention is a water (and by extension energy) saving device because it turns the water automatically on when the user enters the sensing area and turns the water automatically off when the user is not in the sensing area, thereby reducing overall water consumption along with the energy that would be required to heat and pump that water. The electronic showerhead of this invention reliably and consistently turns the water automatically on when a user enters the sensing area and turns the water automatically off when the user is not in the sensing area for users with different heights and perimeters. The electronic showerhead device of this invention does not present the problems of self-triggering or locking the showerhead valve in the ON or OFF positions. The self-contained power source allows for a user to retrofit a conventional showerhead and attach the electronic showerhead without the need for special tools, special plumbing or electrical connections or an electrician or a plumber.

Figure 14:
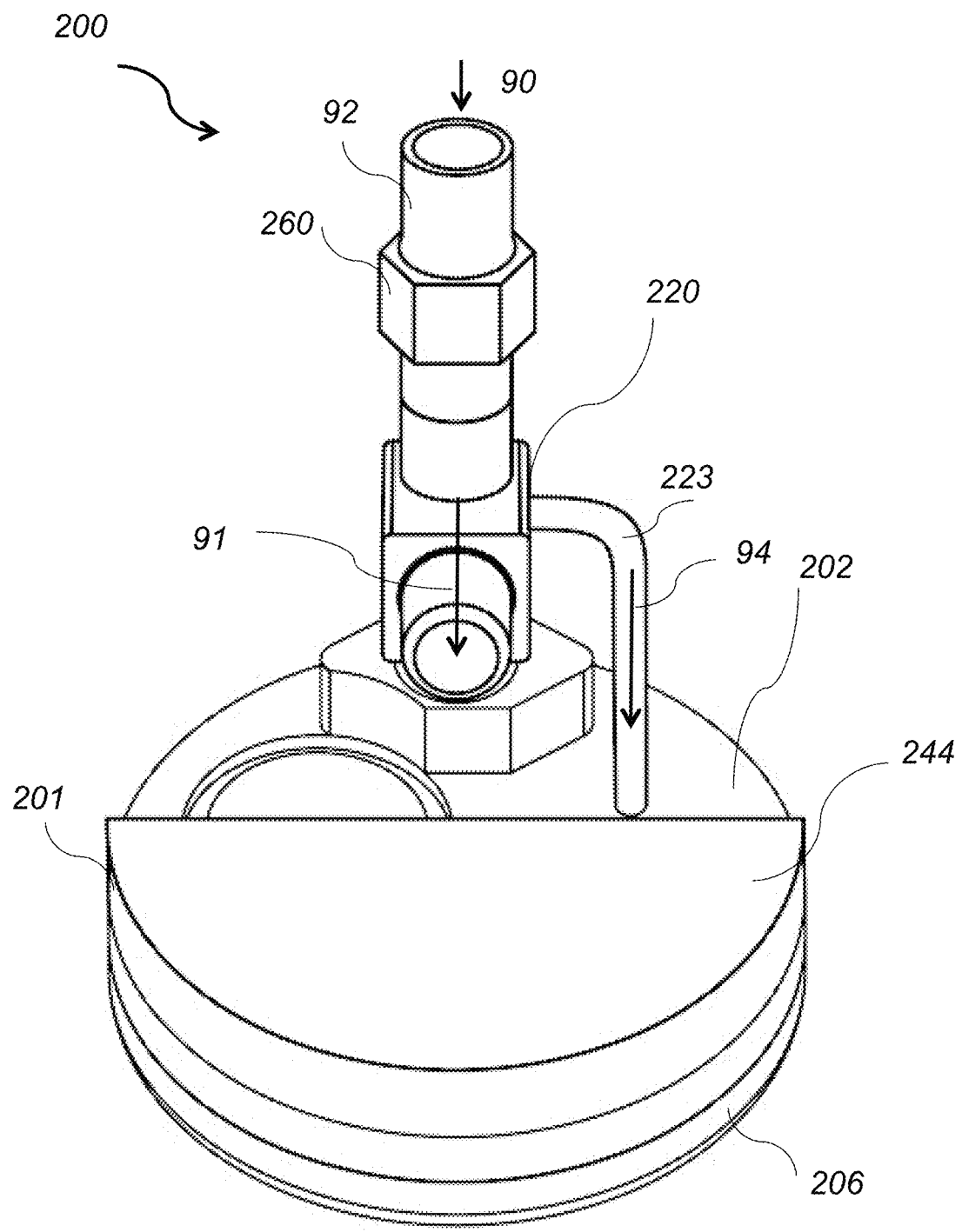
FIG. 14 is a perspective view of another embodiment of the showerhead device.
Figure 15:
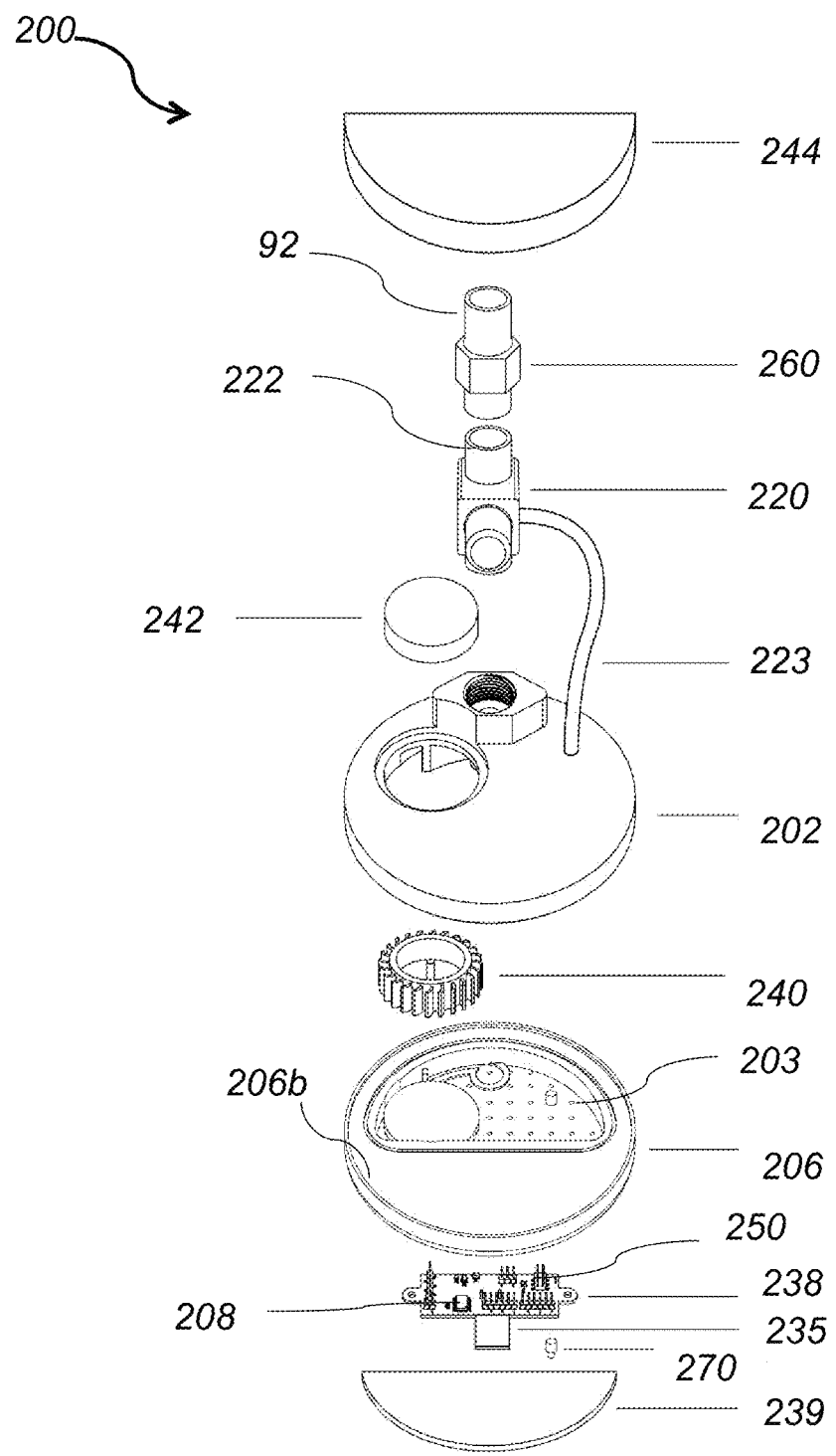
FIG. 15 is an exploded view of the embodiment of the showerhead device of FIG. 14.

Referring to FIG. 14-FIG. 18, another embodiment of an electronic showerhead device 200 according to this invention includes a showerhead 201, a solenoid valve 220, a main flow stream 91 and a secondary flow stream 94. Showerhead 201 includes a flat top component 202 and a flat bottom component 206. A cavity 203 is formed within the inner side 206b of the bottom component 206 as shown in FIG. 15. The showerhead 201 is attached to an inlet water pipe 92 (also shown in FIG. 1) at the top via a swivel joint 260. The solenoid valve 220 is positioned inline with the incoming water stream 90 between the swivel joint 260 and the top component 202 of the showerhead 201. Water exiting the solenoid valve 220 forms the main flow stream 91. The secondary flow stream 94 is provided by a pipe 223 extending from the main inlet pipe 92 and leading to the top component 202.

Figure 16:
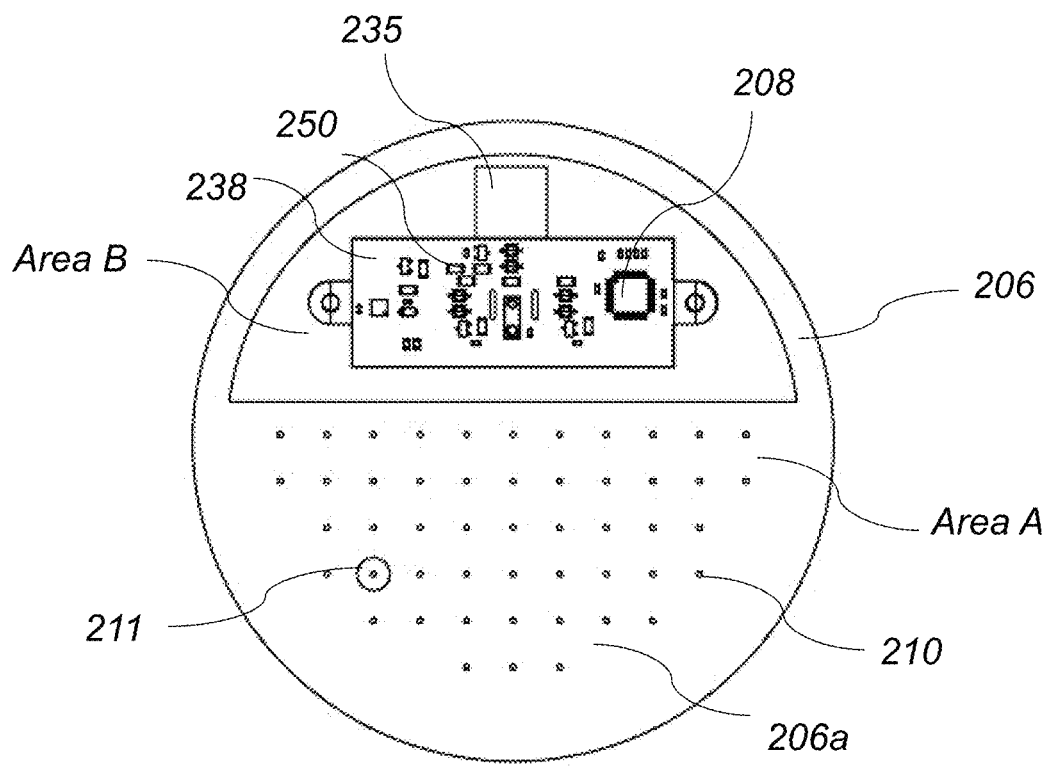
FIG. 16 is bottom view of the embodiment of the showerhead device of FIG. 14.
Figure 17:
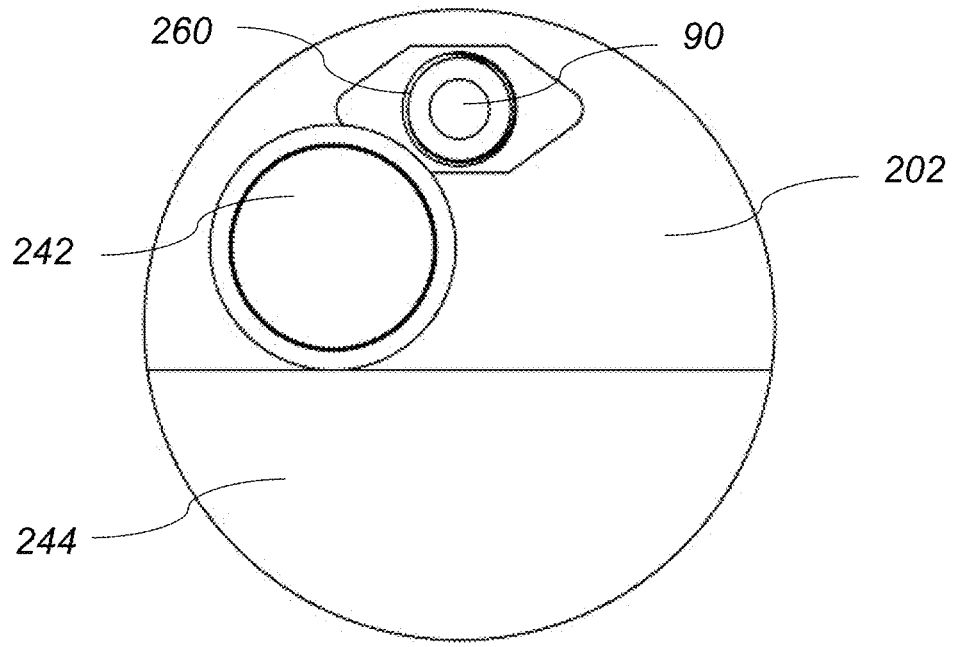
FIG. 17 is a top view of the embodiment of the showerhead device of FIG. 14.
Figure 18:
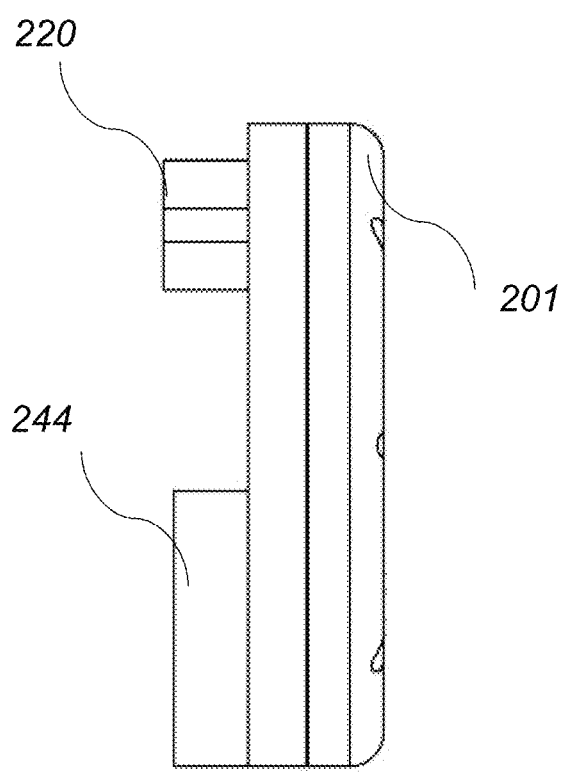
FIG. 18 is a side view of the embodiment of the showerhead device of FIG. 14.
Figure 19:
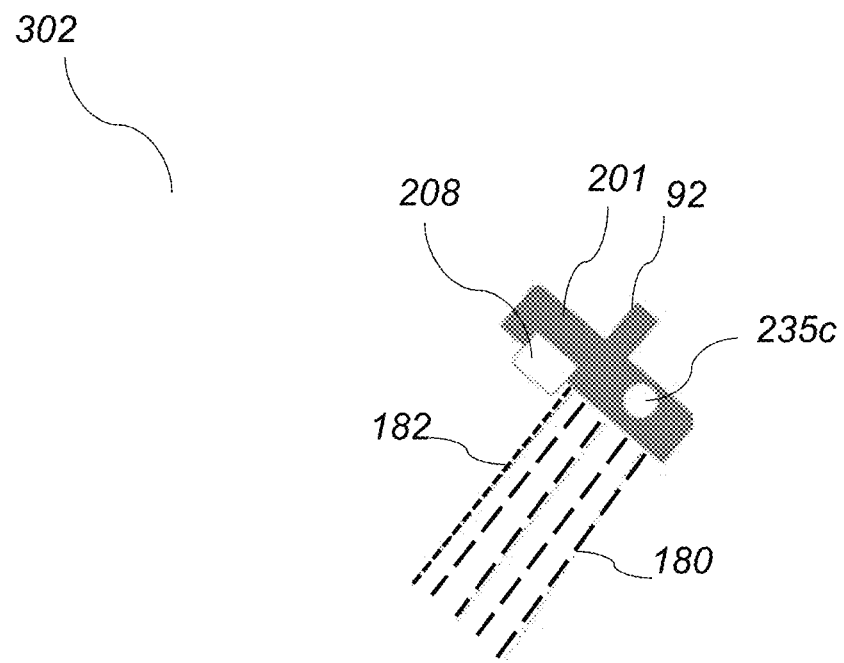
FIG. 19-FIG. 23 depict schematic diagrams of the operation steps of the showerhead device of FIG. 14.
Figure 24:
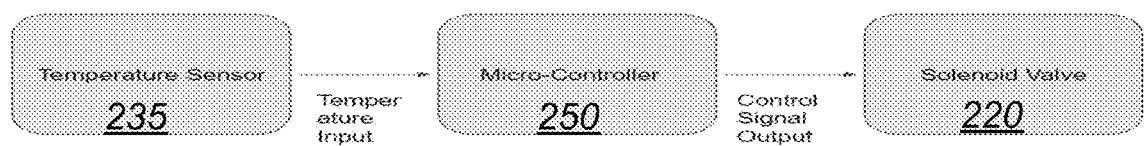
FIG. 24 depicts a block diagram of the temperature sensor control system of the showerhead device of FIG. 14.

Referring to FIG. 16, the bottom surface 206a of the bottom component 206 includes an area A with openings 210 arranged so that they form a spray nozzle. In operation, water 90 enters the showerhead 201 through the inlet pipe 92 and exits through openings 210 and forms a parabolic water stream 180, as shown in FIG. 13 and FIG. 19. Bottom surface 206a of the bottom component 206 also includes a proximity sensor 208 located in area B of the bottom surface adjacent to area A. In one example, proximity sensor 208 is an Infrared (IR) sensor that emits a conical shaped IR beam 150 that extends above and adjacent to the exiting water stream 180. In some embodiments, the conical shaped IR beam 150 is tangential to the water stream 180. Sensor 208 looks for reflected beam signals, and turns "ON" the solenoid valve 220 when a certain threshold of reflected IR energy is met or exceeded, thereby allowing water stream 180 to flow. When the certain threshold of reflected IR energy is not met, sensor 208 turns "OFF" the solenoid valve 220 and the water stream 180 is interrupted. Bottom surface 206a of the bottom component 206 also includes a temperature sensor 235 that measures the temperature of water 90 (either directly or indirectly via temperature measurement of surrounding enclosure(s)) and also controls the ON/OFF function of the solenoid valve 220 via a micro-controller unit (MCU) 250, as shown in FIG. 24. Temperature sensor 235, proximity sensor 208 and MCU 250 are assembled onto a printed circuit board (PCB) 238, which is located in area B of the bottom surface 206a. A sensor lens 239 covers the PCB 238 and protects the electronic components.

Referring to FIG. 29, the overall electronic system diagram 280 of the showerhead device 200 includes an inline generator 240, an energy storage system 244, a power regulator 245, a microcontroller 250, the solenoid 220, the temperature sensor 235, switch 236, and the proximity sensor 208. The switch 236 is configured with the MCU 250 so that when a user powers the showerhead device "OFF" ("manual mode"), the solenoid 220 is latched into the "open" state. In this "open"/OFF state, the electronic showerhead 200 functions like a typical showerhead that is controlled by manual valves. In this embodiment, switch 236 is connected to the MCU 250 and is also used to adjust the sensitivity/threshold of sensors 208 and 235.

Typically, a user turns on a showerhead handle to activate the water flow through the showerhead. In the first initial minutes, the remnant cold water from the pipes is purged and then warmer water starts to flow through the showerhead. This cold water purging process of turning on the showerhead and waiting for it to get hot is a common nuisance problem for many people, and also represents a big source of wasted water and energy, as the users often overestimate the warm-up period and send hot water down the drain that could have been used to shower with. The purpose of the temperature sensor 235 is to automate this initial cold water purging process. As shown in FIG. 24, the output of the temperature sensor 235 is sent to the microcontroller 250 and the microcontroller 250 sends a control output signal to the solenoid valve 220 based on the water temperature reading. The control output signal that the MCU 250 sends to the solenoid 220 controls the ON/OFF operation of the solenoid and thereby the flow of the water stream 180.

Figure 25:
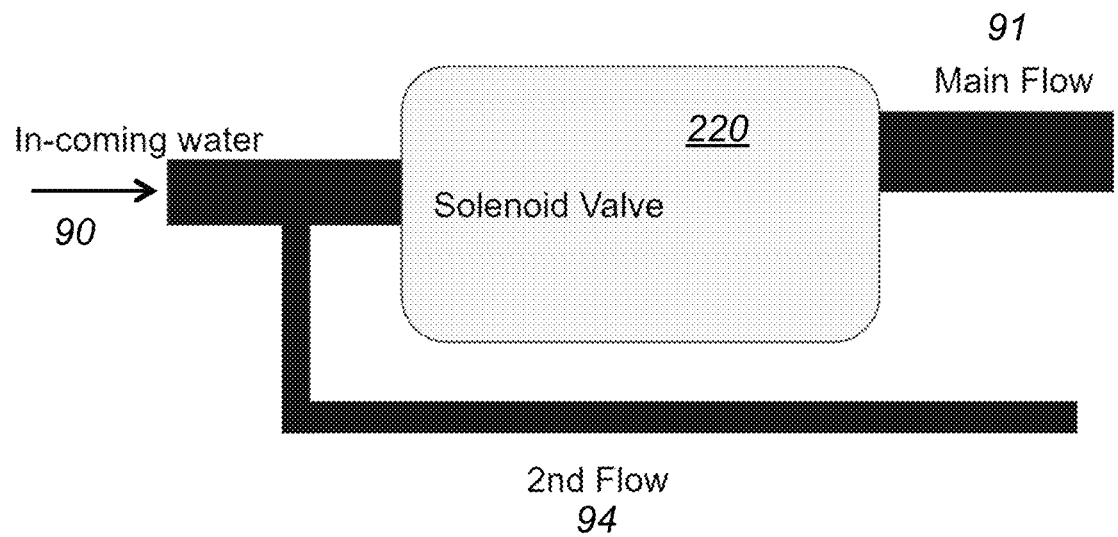
FIG. 25-FIG. 27 depict schematic diagrams of the main water flow and the secondary water flow (signal stream) of the showerhead device of FIG. 14.

Referring to FIG. 25, this embodiment of the showerhead device 200 also includes a secondary flow stream 94 provided by pipe 223 (shown in FIG. 14 and FIG. 15). The secondary flow stream 94 provides a reduced flow exiting water stream 182 (shown in FIG. 20) that resolves a number of issues that may occur including the following:

Users forget to turn the main water-handle valve to the off position after finishing their shower.

Unintended changes in water temperature can result from prolonged pause periods.

Figure 26:
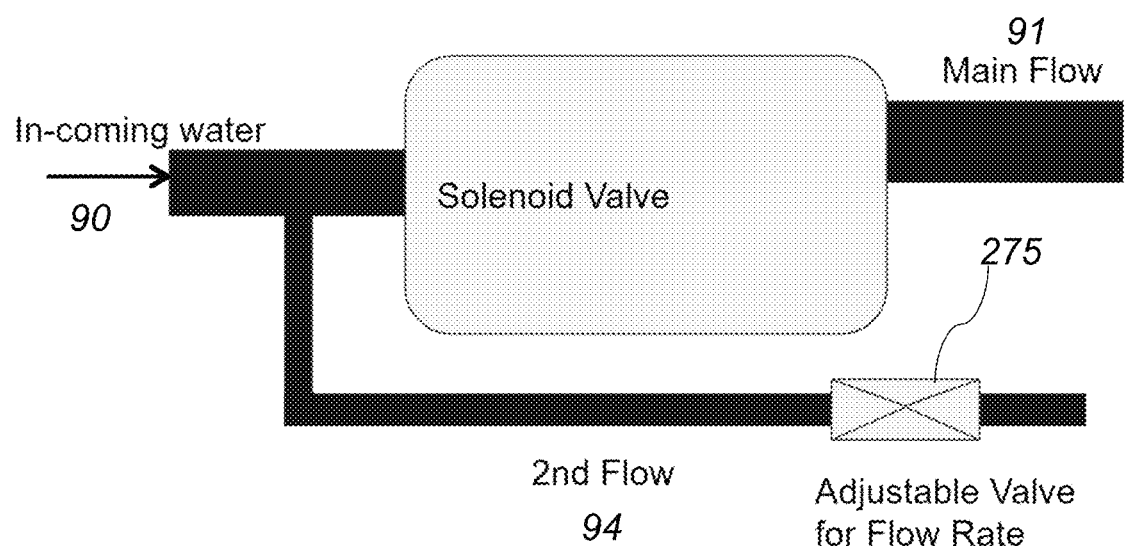
Figure 27:
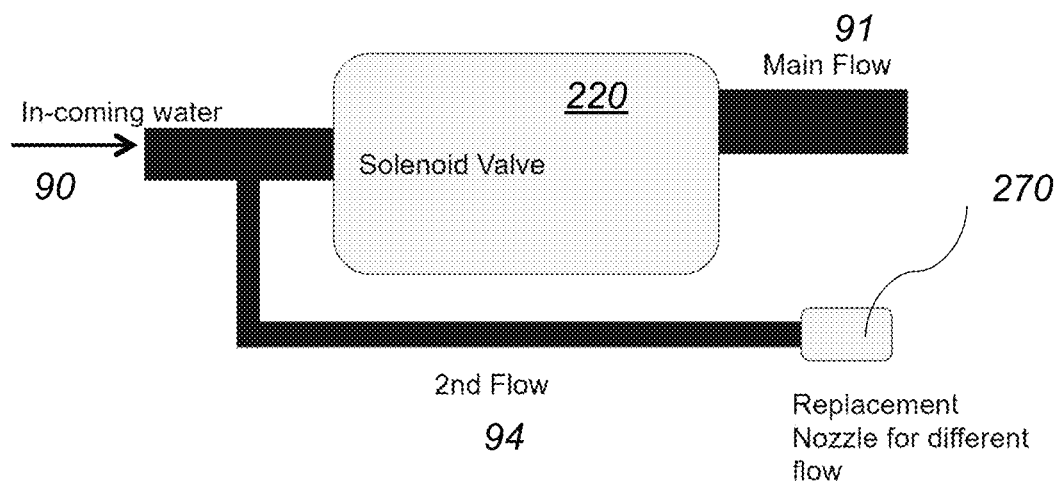

Unintended changes in water temperature usually happen when the shower is hooked up to a tankless water heater which shuts down once load is removed. Unintended water temperature changes may also occur when the plumbing system lacks check-valves, and is prone to "back-flow," which primes the system with hot or cold water during the shower pause periods. Maintaining a reduced flow exiting water stream 182 during the shower pause periods reduces or eliminates these problems for the vast majority of users. In one example, the reduced flow water stream 182 has a flow rate between 0.1 and 1.0 gallons per minute. The secondary flow stream 94 is implemented as having a fixed flow rate, as shown in FIG. 25. In the embodiment of FIG. 26, the secondary flow stream 94 is implemented as having an adjustable flow rate. An adjustable flow rate valve 275 is placed in line with the secondary flow stream 94. In yet another embodiment, the secondary flow stream 94 has a flow rate that can be step-wise adjusted by using nozzles 270 of different sizes that lead to different flow rates, as shown in FIG. 27. In yet other embodiments, the secondary flow stream 94 is implemented via a 3-way valve.

Figure 28:
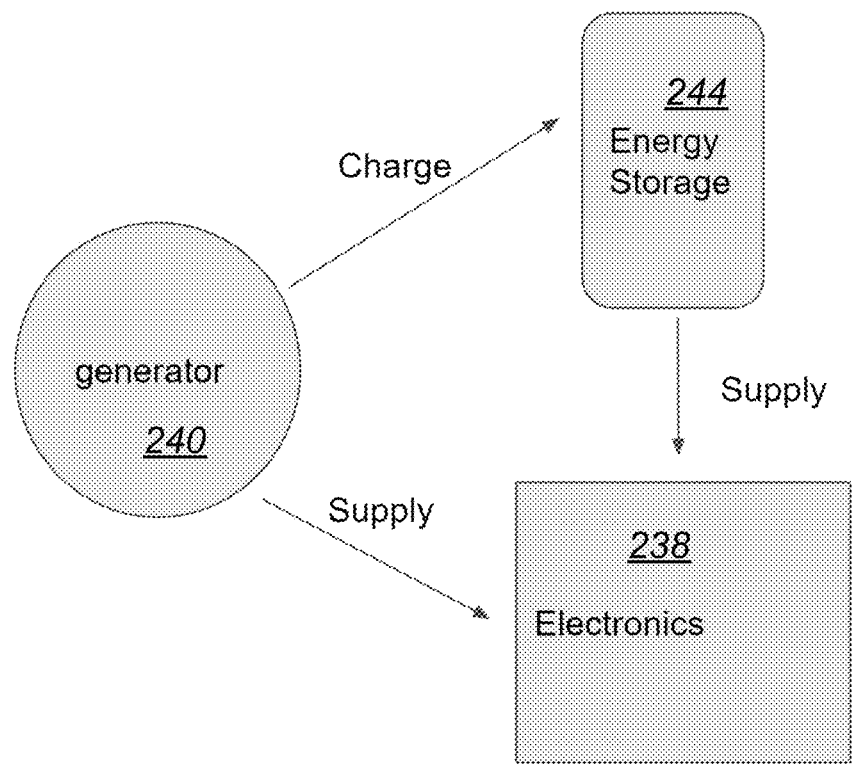
FIG. 28 depicts a block diagram of the generator and the energy storage system of the showerhead device of FIG. 14.

This embodiment of the showerhead device 200 also includes an internal generator 240 and an energy storage system 244. Generator 240 is located within cavity 203, as shown in FIG. 15 and is covered with a generator cap 242. Energy storage system 244 is located on top of the top cavity cover 202. Generator 240 is powered by the water flow through the main flow 91 and stores energy in the energy storage system 244. The stored energy is used to power the electronic components 238 of the showerhead device 200, as shown schematically in FIG. 28. In one example, generator 240 is a turbine system. Including a water-powered generator 240 in the showerhead device eliminates the need for users to replace batteries, which adds to the convenience of the device and also makes it more eco-friendly, by reducing the waste associated with depleted battery disposal. The generator output may also be used as a signal to indicate when the main flow 91 is activated. This process generates data which can be used to enable an accurate calculation of overall water usage and water savings. The water-powered generator 240 is designed to provide ample power to enable the showerhead device operation. Excess power generated by the generator 240 is diverted to the energy storage system 244. Usable energy is generated when the main flow path 91 is open. In other embodiments, the generator 240 is designed to create useable voltages/current from the secondary signal stream 94, as well. The energy storage system 244 is charged by the generator 240, and when the water is paused or partially restricted, the sensors 235, 208 continue to function via the energy in the energy storage system 244, as shown in FIG. 28. In one example, the energy storage system 244 includes a battery and/or a capacitor.

Figure 20:
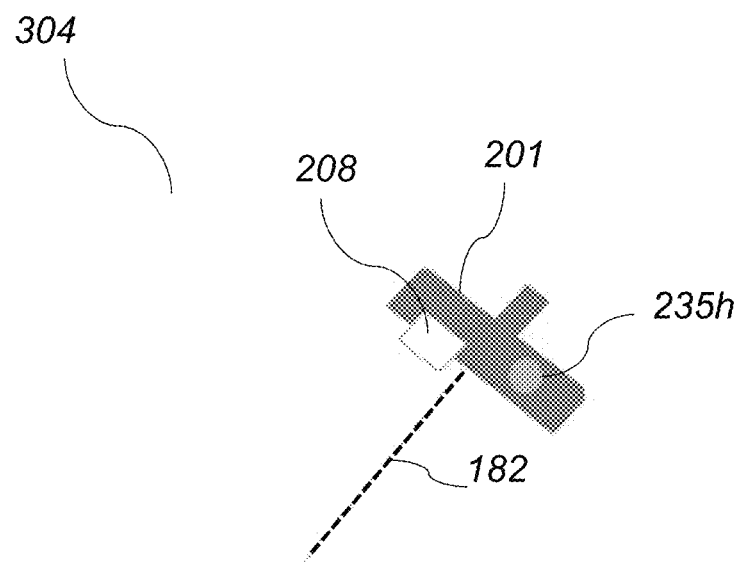
Figure 21:
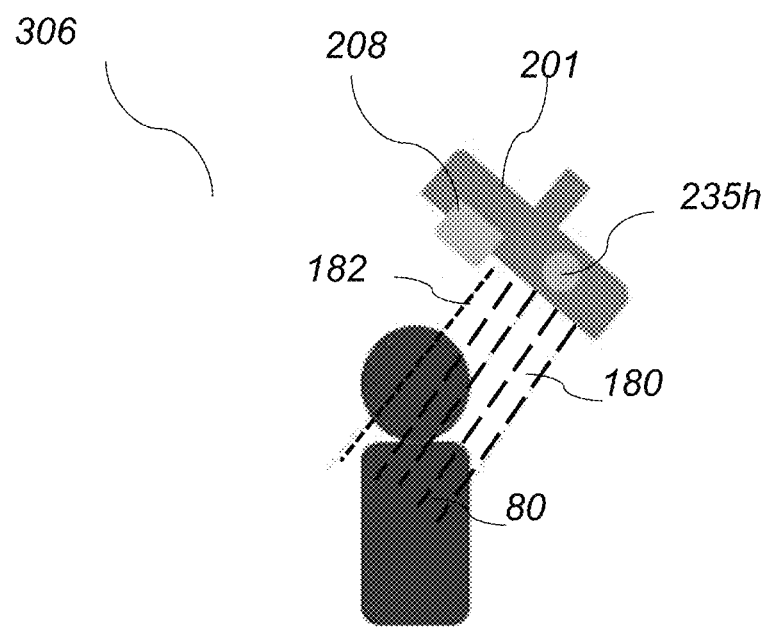
Figure 22:
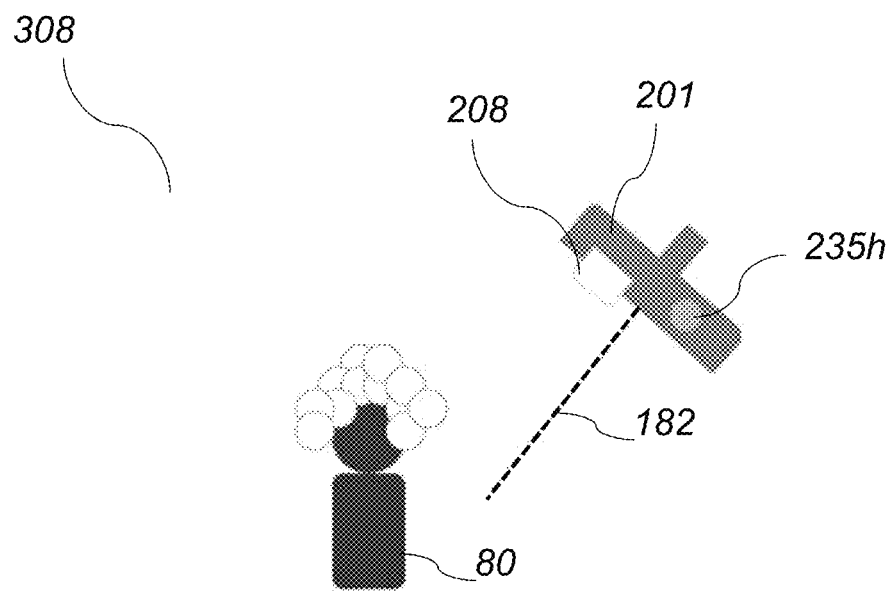
Figure 23:
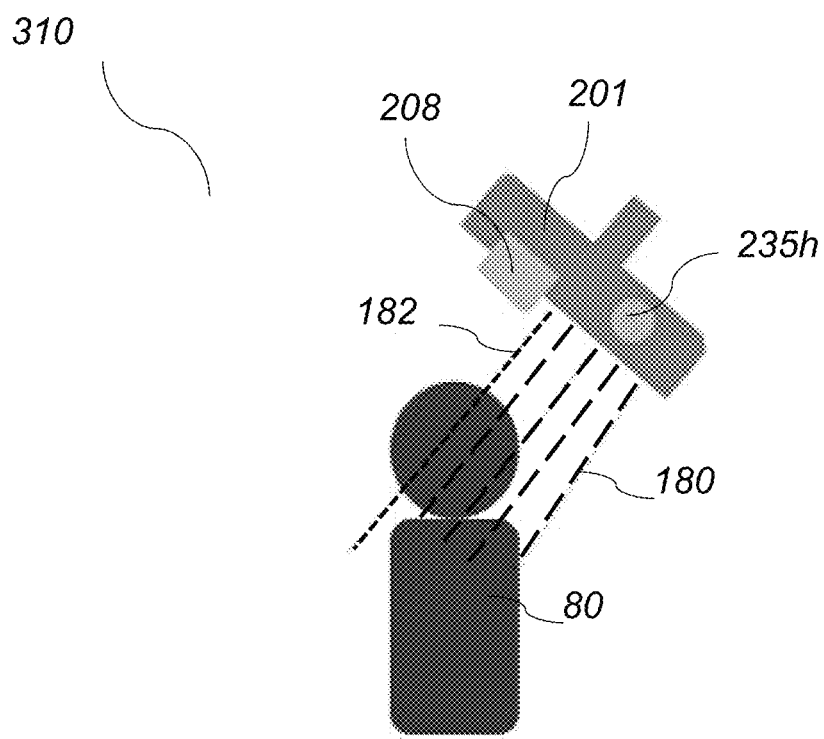

The operation of the showerhead device 200 is described with reference to FIG. 19-FIG. 23. Initially the user turns on the showerhead handle and water flows through the inlet pipe 92 into the showerhead 201, as shown in FIG. 19 (302). The valve 220 starts in the "open" position such that water flows through the main flow steam 91 and through the secondary flow stream 94 and forms the main exiting water stream 180 and the secondary exiting water stream 182, respectively, while remnant cold water from the pipes is being purged. The in-line generator 240 generates power from that cold water flow, and the power is used to power the device as well as to charge the internal energy storage system 244. In this phase, the temperature sensor 235 registers a "cold" temperature 235c, which is a temperature below a predetermined threshold value. Once the cold water has been purged and the water reaches a predetermined 'hot" temperature 235h, the solenoid valve 220 is turned off by the MCU 250 and the main water flow stream 91 is paused, while the secondary reduced flow "signal stream" 94 remains flowing resulting in having only the exiting water stream 182, as shown in FIG. 20 (304). In one example, the predetermined threshold temperature is 37° C. At this point the proximity sensor 208, and the temperature sensor 235 are powered by the energy storage system 244, and the device 200 is waiting for the user 80 to enter the shower. Next, the user 80 enters the shower area and is detected by the proximity sensor 208. The proximity sensor 208 then turns on solenoid 220 and the main water stream 91 opens up resulting in having the main exiting water stream 180 back on in order to provide a full-slow shower experience, as shown in FIG. 21 (306). If the user 80 steps away from the showerhead 201, water through the main flow 91 is temporarily paused while the "signal stream" through the secondary flow 94 remains open, as shown in FIG. 22 (308). This again results in turning the main exiting water stream 180 off, while the secondary existing water stream 182 is unaffected. Full water flow including both main exiting water stream 180 and secondary exiting water stream 182 resumes again when the user 80 steps back underneath the showerhead 200 and is detected by the sensor 208, as shown in FIG. 23 (310). The logic diagram of the valve, sensors and user positions is also depicted in FIG. 30.

Several embodiments of the present invention have been described. Nevertheless, it will be understood that various modifications may be made without departing from the spirit and scope of the invention. Accordingly, other embodiments are within the scope of the following claims.

What is claimed is:

1. An electronic showerhead device for automatically controlling water flow comprising:
   a showerhead body configured to be connected to a main water channel via a main water valve;
   a presence detector located within the showerhead body;
   a first water channel providing a primary water stream exiting the showerhead body;
   a second water channel providing a secondary water stream exiting the showerhead body;
   wherein both the first water channel and the second water channel are connected to the main water channel;
   wherein turning on the main water valve turns on only the secondary water stream, while the primary water stream remains off; and
   wherein subsequent interruption of a presence interrogation beam area by a person or an object turns on the primary water stream, while the secondary water stream remains on.

2. The electronic showerhead device of claim 1, further comprising an electronically controlled valve and wherein the electronically controlled valve is in-line with the first water channel and is activated by the presence detector.

3. The electronic showerhead device of claim 2, wherein the electronically controlled valve comprises an electromagnetic "latching" solenoid.

4. The electronic showerhead device of claim 2, further comprising a temperature sensor that is configured to measure a temperature of a water stream exiting the showerhead and further to control the electronically controlled valve.

5. The electronic showerhead device of claim 4, wherein the presence detector, the temperature sensor, and a microcontroller unit are assembled onto a printed circuit board (PCB) and the PCB is located in the bottom surface of the showerhead body and is covered by a sensor lens.

6. The electronic showerhead device of claim 1, wherein the showerhead body comprises a spray nozzle located in a first area of the bottom surface of the showerhead body and wherein the presence detector is located in a second area of the bottom surface of the showerhead body and wherein the second area does not intersect with the first area.

7. The electronic showerhead device of claim 1, wherein the presence detector comprises an Infrared (IR) sensor that emits a conically shaped IR presence interrogation beam.

8. The electronic showerhead device of claim 7, wherein the conically shaped IR presence interrogation beam comprises a cone angle in the range of 10 degrees to 45 degrees.

9. The electronic showerhead device of claim 1, further comprising an inline generator and an energy storage system.

10. The electronic showerhead device of claim 9, wherein the inline generator comprises a turbine system.

11. A method for automatically controlling water flow in an electronic showerhead device comprising:
    providing a showerhead body configured to be connected to a main water channel via a main water valve and wherein a presence detector is located within the showerhead body;
    providing a first water channel providing a primary water stream exiting the showerhead body;
    providing a second water channel providing a secondary water stream exiting the showerhead body, wherein both the first water channel and the second water channel are connected to the main water channel;
    turning on the main water valve turns on the second water channel, while the first water channel remains off; and
    subsequently interrupting a presence interrogation beam area by a person or an object turns on the first water channel, while the second water channel remains on.

12. The method of claim 11, further comprising providing an electronically controlled valve and wherein the electronically controlled valve is in-line with the first water channel and is activated by the presence detector.

13. The method of claim 12, wherein the electronically controlled valve comprises an electromagnetic "latching" solenoid.

14. The method of claim 13, wherein the showerhead body comprises a spray nozzle located in a first area of the bottom surface of the showerhead body and wherein the presence detector is located in a second area of the bottom surface of the showerhead body and wherein the second area does not intersect with the first area.

15. The method of claim 12, further comprising providing a temperature sensor that is configured to measure a temperature of a water stream exiting the showerhead body and further to control the electronically controlled valve.

16. The method of claim 15, wherein the presence detector, the temperature sensor, and a micro-controller unit are assembled onto a printed circuit board (PCB) and the PCB is located in the bottom surface of the showerhead body and is covered by a sensor lens.

17. The method of claim 11, wherein the presence detector comprises an Infrared (IR) sensor that emits a conically shaped IR presence interrogation beam.

18. The method of claim 17, wherein the conically shaped IR presence interrogation beam comprises a cone angle in the range of 10 degrees to 45 degrees.

19. The method of claim 11, further comprising providing an inline generator and an energy storage system.

20. The method of claim 19, wherein the inline generator comprises a turbine system.

* * * * *